United States Patent
Cole et al.

[11] Patent Number: 5,942,173
[45] Date of Patent: Aug. 24, 1999

[54] METHOD OF FILLING ELONGATED CHANNELS WITH POLYMERIC FOAM

[75] Inventors: Russell L. Cole, Ortonville; Daniel A. Adamic, North Branch, both of Mich.

[73] Assignee: Illinois Tool Works, Inc., Glenview, Ill.

[21] Appl. No.: 09/078,527

[22] Filed: May 13, 1998

[51] Int. Cl.[6] .............................. B29C 44/06; B29C 44/12
[52] U.S. Cl. ....................... 264/46.6; 264/40.1; 264/46.5; 264/161
[58] Field of Search ................................. 264/46.6, 46.5, 264/40.1, 161; 425/145, 812

[56] References Cited

U.S. PATENT DOCUMENTS

| | | |
|---|---|---|
| 4,107,248 | 8/1978 | Schlieckmann ............................ 264/51 |
| 4,158,535 | 6/1979 | Dever, Jr. ................................. 425/145 |
| 5,129,975 | 7/1992 | Easterle et al. ............................ 156/77 |
| 5,173,221 | 12/1992 | Payne ...................................... 264/40.1 |

*Primary Examiner*—Allan R. Kuhns
*Attorney, Agent, or Firm*—Harness, Dickey & Pierce, P.L.C.

[57] ABSTRACT

A method of filling an elongated generally lineal channel with polymeric resin foam, preferably polyurethane foam, using an application gun having a laser sight for accurately aligning the application gun relative to the longitudinal axis of the channel to be filled. The method of this invention includes locating the application gun nozzle opposite the open end of the elongated generally lineal channel to be filled, directing and aligning the laser beam along an axis generally parallel to the longitudinal axis of the lineal channel to a predetermined point exterior of the channel spaced from the open end of the channel, thereby aligning the application gun nozzle generally coincident with the longitudinal axis of the channel, using the application gun to direct a thin elongated stream of liquid foamable polymeric resin into the channel open end along an axis generally coincident with the longitudinal axis of the channel, and allowing the liquid polymeric foam resin to foam and rise through the channel, substantially filling the channel with polymeric foam. In the preferred embodiment, the laser is fixed to the laser gun by a bracket which aligns the laser beam at a small acute angle to the axis of the nozzle of the application gun and the laser beam is then sighted to a point at or adjacent the opposed end of the channel accurately aligning the application gun with the channel to be filled in mass production applications.

20 Claims, 2 Drawing Sheets

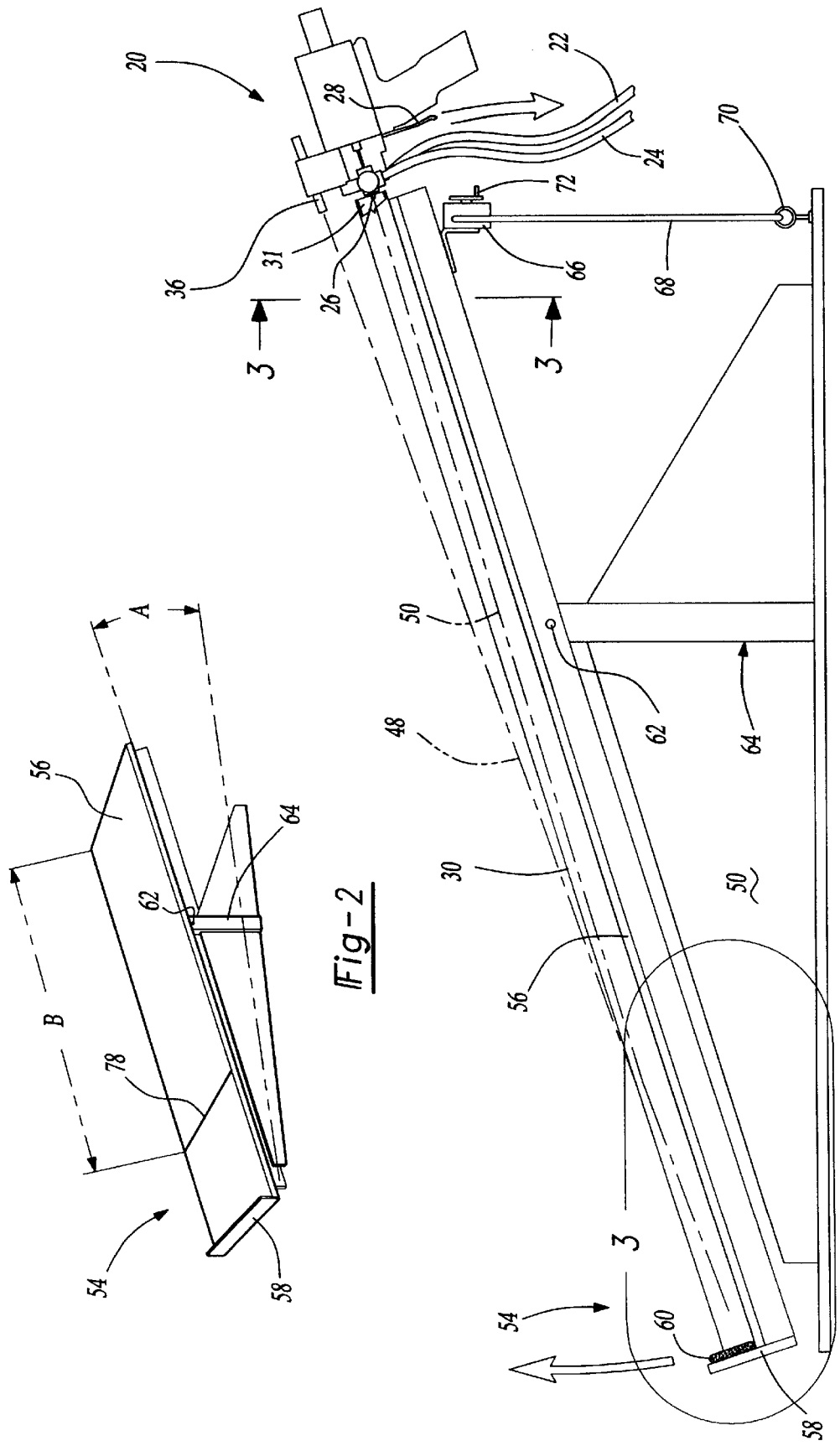

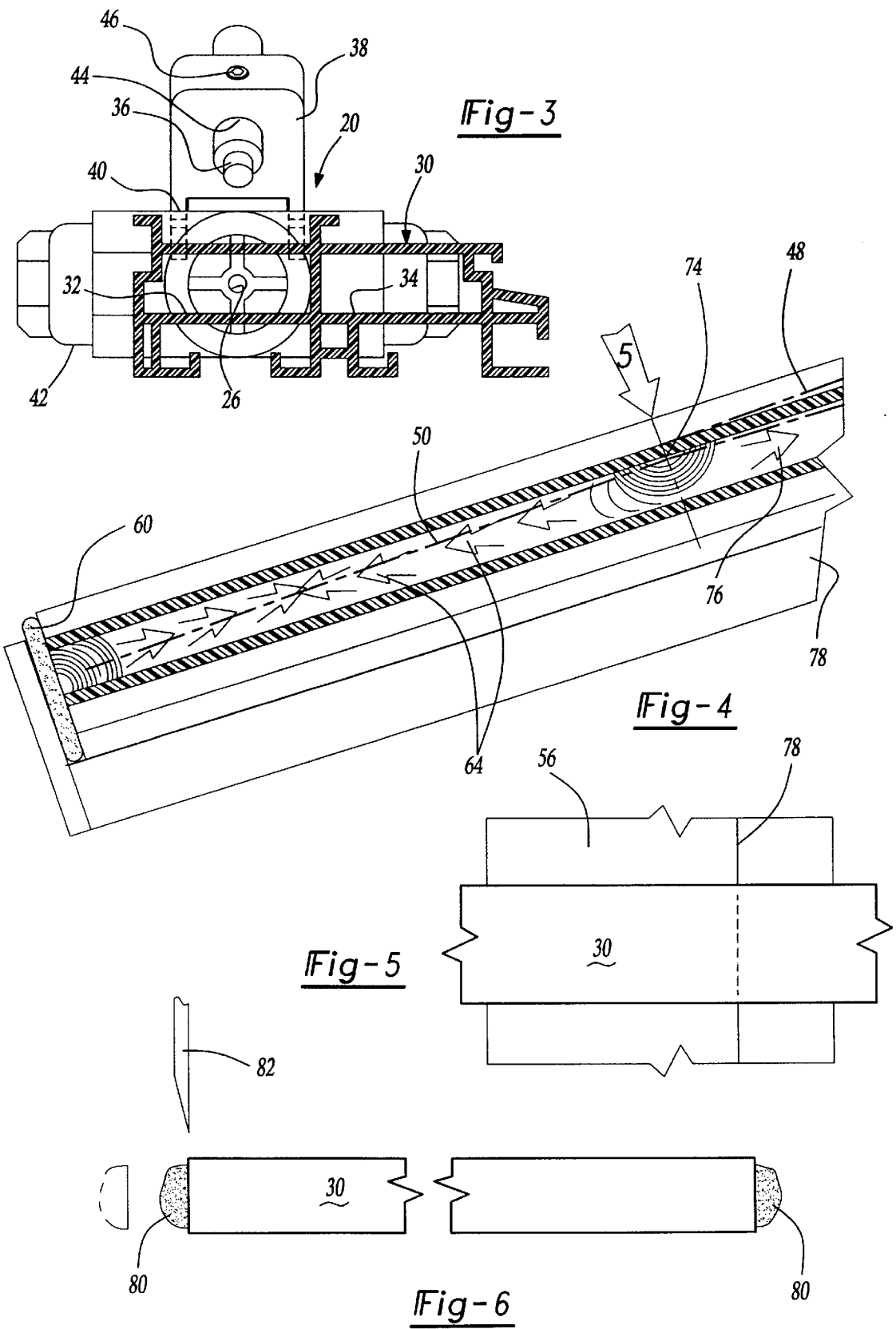

METHOD OF FILLING ELONGATED CHANNELS WITH POLYMERIC FOAM

BACKGROUND OF THE INVENTION

This invention relates to an improved method of filling elongated generally lineal channels with polymeric foam using an application gun which directs a thin elongated stream of liquid foamable polymeric resin generally coincident with the longitudinal axis of the channel through an open end of the channel. More specifically, the method of this invention utilizes a laser light fixed relative to the foam application gun which assures accurate alignment of the stream of foamable polymeric resin even though the operator's view of the inside of the channel is blocked by the application gun. Extruded elongated polyvinyl chloride (PVC) channels are commonly used by the building industry for various applications including, for example, the lineals surrounding a window opening. The extruded lintels are commonly available in twelve and sixteen foot lengths and generally include two or more parallel channels. Preformed or precut foam PVC cores are telescopically inserted into the channels to provide a thermal barrier, reduce sound attenuation and impede air infiltration. The channels to be filled have a cross-sectional area generally ranging from about 0.5 square inches to 2 square inches or greater. It is generally difficult, however, to use a preformed foam core because the shape of the channels may be complex and the shape may vary from channel to channel.

The present commercial methods of filling channels of an extruded lineal with liquid foamable resin result in substantial voids throughout the length of the channels, reducing the advantages of filling the channels with foam. These methods require movement of either the application gun or the lineal, requiring two or three operators. In one method, for example, a conventional foam application gun, such as Gusmer Model D Spray Gun or AR-25 pour gun, is fitted with a metal tubular extension having a length of about three feet or longer. The extension is inserted in one open end of the lineal channel and liquid foamable polyurethane foam is then poured into the channel. The channel is then moved away from the gun to fill one-half of the channel of the lineal with polyurethane foam. The process is then repeated from the opposite end of the lineal to fill the channel with polyurethane foam. In a second commercial method, a polyurethane pour gun is fitted with a flexible house which is inserted several feet into the lineal channel. The hose is then withdrawn as the liquid polyurethane foam is poured into the lineal channel, allowing the filling of the lineal channel from one end. The rate of withdrawal of the hose must be accurately controlled and one operator generally withdraws the hose as the second operator operates the pour gun. Both methods, however, result in substantial voids throughout the lineal channel or inconsistent filling and both methods generally require at least two operators.

U.S. Pat. No. 5,129,975 assigned to the assignee of the present application discloses a method of substantially completely filling elongated channels with polymeric foam by directing a stream of liquid foamable polymeric resin into the channel from one end. In the preferred embodiment of the method disclosed in this patent, the lineal is first oriented at an angle generally about 60° and the application gun is then operated to direct a thin elongated stream of foamable polyurethane into the lineal from the top open end, preferably coincident with the longitudinal axis of the channel, such that the stream impinges at or near the bottom of the channel and the foam rises upwardly through the channel and fills the channel. The primary problem with this method, however, is that the application gun covers the open end of the channel such that the operator cannot accurately align the stream of liquid foamable resin into the channel, particularly in mass production applications. If the nozzle of the application gun is not accurately aligned with the longitudinal axis of the channel, the stream will impinge the side wall of the channel blocking the stream and preventing complete filling of the channel. This is a difficult problem particularly in mass production applications because the channels are relatively small in cross-section as set forth above and the length of the channel is generally twelve or sixteen foot in length. There is therefore a need to provide a simple method of accurately aligning the application gun such that the stream of liquid foamable polymeric resin extends to at least near the end of the channel to completely fill the channel. The method of filling elongated channels of this invention solves this problem by assuring accurate alignment of the application gun with the longitudinal axis of the channel.

SUMMARY OF THE INVENTION

As set forth above, this invention relates to an improved method of filling elongated generally lineal channels with a polymeric resin foam using an application gun having a laser sight which assures substantially complete filling of the channels, particularly in mass production applications. This method is particularly suitable for filling elongated channels having a relatively small cross-section compared to its length, a longitudinal axis and at least one open end, although in most applications the lineal will be open at both ends. Such lineal channels are generally extruded from PVC and are relatively flexible and are commercially available in twelve foot and sixteen foot lengths. In a typical application, the filled extruded lineals are mitered at the ends and secured in a rectangular frame to receive the glass or "lites" of an insulated window or door. Such extruded lineals are also used for thresholds and other applications. It is thus particularly desirable to limit air infiltration, provide a thermal barrier and reduce sound attenuation by filling the channels with foam. The small size and configuration of the channels, however, make filling the channels with foam a difficult problem in mass production applications.

The application gun utilized in the method of this invention must be capable of directing a thin elongated stream of liquid foamable polymeric resin under pressure a distance generally equal to the length of the lineal channels. A suitable application gun is a GX-7 Spray Gun available from Gusmer Corporation of Lakewood, N.J. with a relatively high pressure delivery system such as 700 psi static pressure and the preferred plural component liquid foamable polyurethane is heated to about 110° F. The density of the foam core may range from a relatively flexible open cell foam having a density of about 0.5 PCF to a more rigid close-cell foam having a density of 3.0 PCF or greater. A plural component polyurethane foam is preferred because a single component polyurethane is generally moisture cured. A suitable plural component polyurethane foam is available from ITW Foamseal of Oxford, Mich., a division of Illinois Tool Works, Inc. under the trade name "P7256".

In the improved method of filling elongated lineal channels with polymeric foam of this invention, the application gun includes a laser fixed relative to the application gun in spaced relation to the application gun nozzle adapted to direct a laser beam along an axis which is generally parallel to the axis of the thin elongated stream of liquid foamable polymeric resin generated through the nozzle of the application gun. In the most preferred embodiment, the laser is fixed relative to the application gun to generate a laser beam at a small acute angle relative to the axis of the elongated stream of liquid foamable polymeric resin, preferably at a relative angle of 1° to 3° for accurate alignment of the liquid stream as described below. In the most preferred embodiment, the laser is fixed relative to the nozzle of the application gun a distance greater than one-half the cross-section of the lineal channel to be filled with polymeric foam, such that the laser sights a predetermined point exterior of the channel as described below in the description of the method of this invention.

The method of filling an elongated generally lineal channel of this invention then includes locating the application gun nozzle opposite an open end of the elongated generally lineal channel. As will be understood, the application gun may be initially located by the operator such that the nozzle is generally aligned with the longitudinal axis of the elongated lineal channel; however, as described above, the application gun then blocks the operator's view of the open end of the channel, making it difficult to accurately align the application gun with the channel, particularly in mass production applications where hundreds or thousands of channels must be filled with polymeric foam each day. Further, as set forth above, the channels are generally twelve foot or sixteen foot in length having a cross section ranging from about 0.5 square inches to 2 square inches. Thus, it is not possible for the operator to sufficiently align the nozzle of the application gun with the longitudinal axis of the channels to completely fill all of the channels with polymeric foam in mass production applications.

The improved method of this invention then includes directing and aligning the laser beam fixed relative to the application gun along a second axis generally parallel to the longitudinal axis of the elongated lineal channel to a predetermined point exterior of the channel spaced from the open end of the channel, thereby aligning the application gun nozzle generally coincident with the longitudinal axis of the elongated channel. The preferred location of the alignment point will depend upon the length of the channel and the orientation of the laser relative to the nozzle of the application gun. In a sixteen foot channel, for example, the laser is preferably aligned with an alignment point spaced from the opposed end of the channel and the laser is preferably aligned with the axis of the application gun nozzle at an acute angle as described above, such that the thin elongated stream of liquid foamable polymeric resin impinges a side wall of the channel adjacent the opposed end of the channel, for example, approximately twelve feet from the open end of the channel. In a twelve foot lineal, the preferred alignment point is at or near the end of the lineal channel. The preferred geometry will thus depend upon the length and cross-section of the channel and the length and arc of the thin elongated stream of liquid foamable polymeric resin. However, regardless of these parameters, the laser beam accurately aligns the nozzle of the application gun to completely fill the channel with polymeric foam even in mass production applications. Any suitable laser may be utilized in the method of this invention including for example a "Slimline" laser pointer available from Radio Shack, such as Model LX1100. In the most preferred embodiment, the laser is mounted on the laser gun by a suitable bracket which accurately aligns the laser beam relative to the axis of the nozzle of the application gun for accurate alignment of the nozzle with the longitudinal axis of the elongated lineal channels.

The accurately aligned application gun is then operated to direct a thin elongated stream of liquid foamable polymeric resin along the axis of the nozzle into the open end of the elongated lineal channel to a point at or adjacent the opposed end of the channel, such that the liquid foamable polymeric resin foams and rises through the channel substantially filling the channel with polymeric resin foam. The opposed end of the elongated lineal channel is generally open, but may be closed by a permeable membrane such as a section of open cell foam or felt which permits air to escape as the channel fills with foam.

One advantage of the improved method of filling an elongated lineal channel with polymeric resin foam of this invention is that the elongated lineal channels may be oriented horizontally generally during filling. However, in the most preferred embodiment of the method of this invention where the lineal channel is relatively long and the cross-section is small, the lineal channels are preferably oriented at an acute angle relative to horizontal to assure complete filling of the channels. An angle of between about 15° and 20° from horizontal with the open end to be filled is located at the top of the channel has been found particularly suitable for the method of this invention when filling longer channels.

Other advantages and meritorious features of the improved method of filling elongated generally lineal channels with polymeric foam of this invention will be more fully understood from the following description of the preferred embodiments, the appended claims and the drawings, a brief description of which follows.

BRIEF DESCRIPTION OF THE DRAWINGS

FIG. 1 is a side view illustrating a suitable apparatus set up and aligned to perform one preferred embodiment of the method of filling elongated lineal channels with polymeric foam of this invention;

FIG. 2 is a side elevated perspective view of one embodiment of an adjustable work table suitable for filling longer lineal channels with polymeric foam;

FIG. 3 is a side partially cross-sectioned view in the direction of view arrows 3—3 of FIG. 1 with an application gun aligned with a lineal channel ready for filling the channel with polymeric foam;

FIG. 4 is an enlarged partial cross-sectional side view of FIG. 1 illustrating one embodiment of the method of this invention;

FIG. 5 is a top partial view of FIG. 4 in the direction of view arrow 5; and

FIG. 6 is a sectioned top view of the elongated lineal channel following filling of the channel with polymeric foam as the excess foam is cut from the channel.

DETAILED DESCRIPTION OF THE PREFERRED EMBODIMENTS

As set forth above, the improved method of filling elongated lineal channels with polymeric foam of this invention utilizes an application gun 20 capable of directing a thin elongated stream of liquid foamable polymeric resin, such as the application gun illustrated in FIG. 1. The application gun includes lines 22 and 24 which connect the gun to a source of liquid foamable polymeric resin (not shown). The illustrated embodiment includes two lines 22 and 24 because in the preferred embodiment of the method of this invention, the polymeric foam is a plural component foamable polyurethane and therefore the components of the liquid foamable polyurethane are fed individually to the application gun 20 and mixed in the gun immediately prior to application. As will be understood, however, various applications guns and polymeric foam may be utilized with the method of this invention provided the application is capable of directing an elongated stream of liquid foamable polymeric resin under pressure for a distance sufficient to extend substantially the entire length of the elongated lineal channel to be filled. The application gun includes a nozzle 26 best shown in FIG. 3 and the application gun is actuated by a trigger 28 as shown in FIG. 1. As set forth above, a suitable application gun is Model GX-7 Spray Gun available from Gusmer Corporation.

The shape and configuration of the elongated lineal channel 30 will vary according to its ultimate application. FIG. 3 illustrates the cross-section of a typical extruded PVC lineal which in the disclosed embodiment includes two elongated configured channels 32 and 34. PVC extruded lineals for window and door applications are generally supplied in twelve foot and sixteen foot lengths and the cross-sectional area of the channels 32 and 34 ranges from about 0.5 square inches to 2 square inches or greater. Thus, the stream of liquid foamable polymeric resin or preferably liquid foamable polyurethane must be directed by the application gun 20 under a relatively high pressure so that the stream of liquid foamable polymeric resin extends substantially the length of the lineal 30.

In the disclosed embodiment, a conventional laser 36 is accurately mounted on the application gun 20 by a bracket 38. The bracket 38 includes a U-shaped saddle portion 40 which is received over a rectangular portion of the application gun 20 and adjustably mounted by set screws 42. The laser 36 is releasably retained in a cylindrical opening 44 in the bracket 38 by set screw 46. In the disclosed preferred embodiment of the application gun and laser assembly, the axis 48 of the laser 36 defines a small acute angle relative to the axis 50 of the nozzle 26 which is also the axis of the thin elongated stream of liquid foamable polymeric resin generated by the application gun 20. An acute angle of 1° to 3° has been found particularly suitable for filling extruded lineals having a length of twelve to sixteen feet; however, as described above, the preferred angle will depend upon the length of the lineals to be filled, the pressure at which the elongated stream of liquid foamable polymeric resin is generated, the angle of the lineal relative to horizontal and other factors. In some applications, the axis 48 of the laser may be parallel to the axis of the stream 50 generated by the laser light or gun.

As set forth above, one advantage of the improved method of filling elongated lineal channels with polymeric resin foam of this invention is that in many applications the lineals may be oriented horizontally depending upon the length of the lineal, the size of the channels to be filled, the polymeric foam and the application gun. In the disclosed embodiment of the method of this invention, the lineals 30 are oriented at an acute angle to horizontal which is preferred for longer lineals and the application equipment described. In the disclosed embodiment, the lineals are supported on a work table 54 having an adjustable work surface 56 and a foot 58 which supports the elongated lineals during filling of the channels with polymeric resin foam. As set forth above, the preferred angle of the work surface 56 relative to horizontal will depend upon several factors including the selected application gun, the polymeric resin foam and the length and geometry of the channels to be filled. In the disclosed preferred embodiment of the method of filling longer elongated lineal channels with polymeric foam of this invention, the angle A shown in FIG. 2 is adjustable to between about 15° and 20° from horizontal or in the disclosed embodiment 17°. The extruded lineal 30 is then supported on the work surface 56 with one end supported on the foot 58 and the open end located at the top as shown in FIG. 1. As will be understood, however, extruded PVC lineals are open at both ends and therefore in the disclosed embodiment, the lower end is closed with a permeable membrane 60 which may be a piece of open cell foam, felt or the like, which permits air to escape from the lower end of the lineal 30 as the lineal is filled with polymeric resin foam.

In the disclosed embodiment of the work table 54, the angle of the work surface 56 is adjustable to any desired angle from 0° (horizontal) to about 20°, to permit filling of the channels of the lineals at horizontal or at an acute angle as described above. The work surface 56 is supported on a transverse pivot rod 62, which is supported on a frame 64 and a conventional winch 66 is provided to adjust the angle of the work surface 56. A rope or wire 68 is wound around the winch 66 which is connected to an eye bolt 70 attached to an end of the frame. The angle of the work surface 56 may then be adjusted from horizontal to an acute angle by turning the crank 72. It has been found advantageous, however, to incline extruded lineals having a length of sixteen feet at an angle of between about 15° and 20° when filling such extruded lineals with plural component polyurethane foam. Having described the application equipment, it is now possible to describe the method of this invention which follows.

First, the application gun 20 is located opposite an open end 31 of a lineal channel 32 with the nozzle 26 generally aligned with the longitudinal axis of the channel as shown in FIGS. 1 and 3. The laser 36 is then operated to direct a laser light beam 48 to a predetermined point exterior of the channel 32 and lineal 30, which aligns the nozzle 26 generally coincident with the longitudinal axis of the elongated lineal channel 32 as described more fully hereinbelow. The application gun 20 is then operated to direct a thin elongated stream 50 of liquid foamable polymeric resin into the channel open end, which axis is generally coincident with the longitudinal axis of the channel. The liquid foamable polymeric resin then foams and rises through the channel, substantially filling the channel with polymeric foam.

FIG. 4 illustrates one preferred method of filling a longer lineal channel with polymeric foam, such as a sixteen foot extruded PVC channel having a relatively small cross-section, wherein the laser beam 48 (FIG. 1) is sighted to a predetermined point spaced from the opposed end of the channel, which in the disclosed embodiment is the lower end of the channel. Where the laser is so aligned, the stream of liquid foamable polymeric resin impinges a side wall of the channel at 74 adjacent, but spaced from the opposed end of the channel and the liquid foamable resin then foams and rises in both directions as shown by arrows 76. In a sixteen foot lineal, for example, a suitable point 74 is located about twelve feet from the open end 31 of the channel or four feet from the opposed end. In a twelve foot lineal the laser may be sighted at the opposed end of the lineal, such that the liquid stream of foamable resin carries to the end of the channel. Alternatively, the laser may be directed to the closed end of the channel even with sixteen foot lineals. In the disclosed embodiment, the work surface is provided with transverse indicia 66 such that the distance B the stream of liquid foamable resin can be accurately controlled to provide an impingement point 74 or not depending upon the lineal to be filled.

As will be understood by those skilled in the art, the application gun 20 can be controlled to provide a predetermined volume of liquid foamable polymeric resin to assure complete filling of a lineal channels 32 and 34 with each shot of the application gun 20. In the most preferred method of this invention, the volume is controlled to assure complete filling of the elongated channels such that a small excess 80 of polymeric foam extends out both ends of the channel. The excess 80 is then cut off with a conventional knife 82.

The improved method of filling elongated generally lineal channels with polymeric foam of this invention therefore solves the problems associated with the prior art, including U.S. Pat. No. 5,129,975, and permits the use of this method for mass production applications. As shown in FIGS. 1 and 3, the application gun 20 completely blocks the operator's view of the open end of channels 32 and 34, making it difficult to accurately align the nozzle 26 of the application gun with the longitudinal axis of the channels. This is particularly true where the lineal includes multiple channels 32 and 34 as shown in FIG. 3. The laser sighting method of this invention, however, solves this problem in a simple manner, thereby permitting relatively unskilled operators to substantially completely fill the small elongated channels with polymeric foam. As will be understood and described above, however, various modifications may be made to the disclosed embodiment of the method of this invention within the purview of the appended claims. For example, the lineals may be adjusted to a horizontal position in some applications, particularly where the lineal is shorter than sixteen feet or where the channel has a larger cross-section. Further, the application gun may be oriented by the laser such that the stream of foamable polymeric resin reaches the bottom of the channel with out impinging a side wall, which may be preferred with shorter lineals or lineals including channels having a larger cross-section. As will be understood, however, even a relatively thin, high pressure stream of liquid foamable resin generated by a conventional dispensing gun will expand with distance. It is therefore important to carry the stream of liquid foamable resin to adjacent the opposed end of the channel before the stream impinges against a side wall to avoid blocking the channel as the foamable resin foams and rises. Further, the improved method of this invention may be utilized to fill multiple channels in a lineal and the lineals may be stacked on the work surface for more efficient operation.

We claim:

1. A method of filling an elongated generally lineal channel with polymeric resin foam using an application gun, said elongated generally lineal channel having a small cross-section relative to its length, a longitudinal axis and at least one open end, said application gun adapted to direct a thin elongated stream of liquid foamable polymeric resin along a first axis and a laser fixed relative to said application gun spaced from an application gun nozzle adapted to direct a laser beam along a second axis spaced from said first axis, said method comprising the following steps:

locating said application gun nozzle opposite said open end of said elongated generally lineal channel;

directing and aligning said laser beam along said second axis generally parallel to said longitudinal axis of said elongated generally lineal channel to a predetermined point exterior of said channel spaced from said open end of said channel, thereby aligning said application gun nozzle generally coincident to said longitudinal axis of said elongated generally lineal channel;

directing said thin elongated stream of liquid foamable polymeric resin into said channel open end along said first axis generally coincidental with said longitudinal axis of said channel; and allowing said liquid foamable polymeric resin to foam and rise through said channel, substantially filling said channel with polymeric resin foam.

2. The method of filling an elongated generally lineal channel with polymeric resin foam as defined in claim 1, wherein said method includes directing said laser beam along said longitudinal axis of said elongated generally lineal channel to a point exterior of said channel, spaced from said open end.

3. The method of filling an elongated generally lineal channel with polymeric resin foam as defined in claim 1, wherein said method includes first orienting said elongated generally lineal channel at an acute angle relative to horizontal with said open end at the top of said channel, and wherein said liquid foamable resin foams and rises upwardly through said channel.

4. The method of filling an elongated generally lineal channel with polymeric resin foam as defined in claim 3, wherein said method includes first orienting said elongated generally lineal channel at an angle of between about 15° and 20° from horizontal with said open end located at the top.

5. The method of filling an elongated generally lineal channel with polymeric resin foam as defined in claim 1, wherein said method includes closing an end of said channel opposite said open end with a permeable membrane which permits air to escape said channel as said channel is filled with liquid foamable polymeric resin.

6. The method of filling an elongated generally lineal channel with polymeric resin foam as defined in claim 1, wherein said polymeric resin foam is a plural component polyurethane foam, said method including mixing said plural components of a foamable polyurethane immediately prior to directing said elongated stream of liquid foamable polyurethane into said channel open end.

7. The method of filling an elongated generally lineal channel with polymeric resin foam as defined in claim 1, wherein said method includes directing said thin elongated stream of liquid polymeric resin into said channel at an acute angle relative to said longitudinal axis of said channel.

8. A method of filling an elongated generally lineal channel with a polymeric resin foam using an application gun, said elongated generally lineal channel having a small cross-section relative to its length, a longitudinal axis, at least one open end and an opposed end, said application gun adapted to direct a thin elongated stream of liquid foamable polymeric resin along a first axis and a laser fixed relative to said application gun spaced from an application gun nozzle a distance greater than one-half said cross-section of said elongated generally lineal channel adapted to direct a laser beam along a second axis defining a small acute angle relative to said first axis, said method comprising the following steps:

locating said application gun opposite said open end of said elongated generally lineal channel such that said first axis is generally in the direction of said longitudinal axis of said channel;

directing and aligning said laser beam along said second axis parallel with said longitudinal axis of said elongated generally lineal channel to a predetermined point exterior of said channel adjacent said opposed end of said channel, thereby aligning said application gun nozzle first axis generally coincident with said longitudinal axis of said elongated generally lineal channel;

directing said thin elongated stream of liquid polymeric resin into said channel open end along said first axis generally coincident with said longitudinal axis of said channel; and allowing said liquid foamable polymeric resin to foam and rise through said channel, substantially filling said channel with polymeric resin foam.

9. The method of filling an elongated generally lineal channel with polymeric resin foam as defined in claim 8, wherein said method includes first orienting said elongated generally lineal channel longitudinal axis at an angle of between about 15° and 20° from horizontal with said open end at the top of said channel.

10. The method of filling an elongated generally lineal channel with polymeric resin foam as defined in claim 8, wherein said method includes directing said thin elongated stream of liquid foamable polymeric resin into said channel open end having a predetermined volume greater than the volume of said elongated generally lineal channel, allowing said liquid foamable polymeric resin to foam and rise through said channel and extending beyond said open end and thereafter trimming said polymeric resin foam which extends beyond said open end.

11. The method of filling an elongated generally lineal channel with polymeric resin foam as defined in claim 8, wherein said method includes directing said thin elongated stream of liquid foamable polymeric resin into said channel at an acute angle relative to said longitudinal axis of said channel such that said stream intersects a side wall of said channel spaced from said opposed end.

12. The method of filling an elongated generally lineal channel with polymeric resin foam as defined in claim 11, wherein said method includes directing said laser beam along said channel to a point located on said channel adjacent said opposed end.

13. The method of filling an elongated generally lineal channel with polymeric resin foam as defined in claim 8, wherein said polymeric resin foam is a plural component polyurethane foam, said method including mixing the components of said polyurethane foamable resin immediately prior to directing said thin elongated stream into said channel.

14. The method of filling an elongated generally lineal channel with polymeric resin foam as defined in claim 8, wherein said opposed end of said elongated generally lineal channel is open, said method including closing said opposed end of said channel with a permeable membrane which permits air to escape as said channel is filled with polymeric resin foam.

15. A method of filling an elongated generally lineal channel with a plural component polyurethane foam using an application gun, said elongated generally lineal channel having a longitudinal axis, a relatively small cross-section relative to its length, at least one open end and an opposed end, said application gun adapted to direct a thin elongated stream of a plural component foamable polyurethane along a first axis and a laser fixed relative to said application gun spaced from an application gun nozzle a distance equal to greater than one-half said cross-section of said channel adapted to direct a laser beam along a second axis defining an acute angle relative to said first axis, said method comprising the following steps:

locating said application gun nozzle opposite said open end of said elongated generally lineal channel;

directing and aligning said laser beam along said second axis parallel to said longitudinal axis of said elongated generally linear channel to a predetermined point exterior of said channel adjacent said opposed end of said channel, thereby aligning said axis of said application gun nozzle generally coincident with said longitudinal axis of said elongated generally lineal channel;

mixing the liquid components of a foamable plural component foamable polyurethane and promptly directing a thin elongated stream of liquid foamable polyurethane into said channel open end along said first axis; and allowing said plural component polyurethane to foam and rise through said channel, substantially filling said channel with plural component polyurethane foam.

16. The method of filling an elongated generally lineal channel with a plural component polyurethane foam as defined in claim 15, wherein said opposed end of said elongated generally lineal channel is open, said method including closing said opposed end of said channel with a permeable membrane which permits air to escape said opposed end of said channel as said channel is filled with plural component polyurethane foam.

17. The method of filling an elongated generally lineal channel with a plural component polyurethane foam as defined in claim 15, wherein said method includes directing said laser beam along said channel to a point located exterior of said channel spaced from said open end.

18. The method of filling an elongated generally lineal channel with a plural component polyurethane foam as defined in claim 15, wherein said method includes first orienting said elongated generally lineal channel at an acute angle relative to horizontal with said open end located at the top, wherein said liquid foamable polyurethane foams and rises upwardly through said channel.

19. The method of filling an elongated generally lineal channel with a plural component polyurethane foam as defined in claim 15, wherein said method includes directing said thin elongated stream of liquid foamable polyurethane into said channel along said first axis at an acute angle relative to said longitudinal axis of said channel such that said thin elongated stream of liquid foamable polyurethane intersects an outer wall of said channel adjacent said opposed end.

20. The method of filling an elongated generally lineal channel with a plural component polyurethane foam as defined in claim 15, wherein said method includes orienting said laser relative to said application gun such that said second axis of said laser defines an acute angle relative to said first axis of between about 1° and 3°.

* * * * *